Aug. 28, 1951     N. P. KRILICH     2,565,660
FISH LURE
Filed Dec. 6, 1947
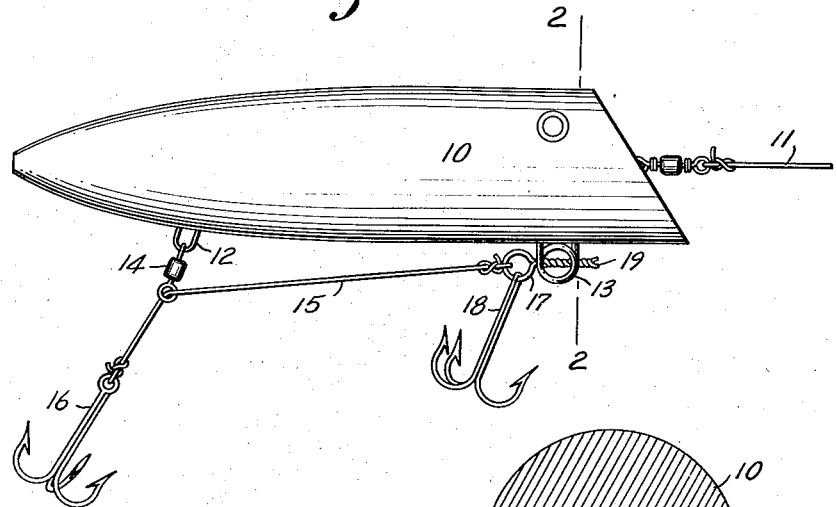
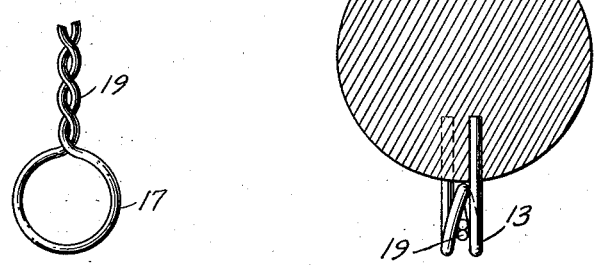
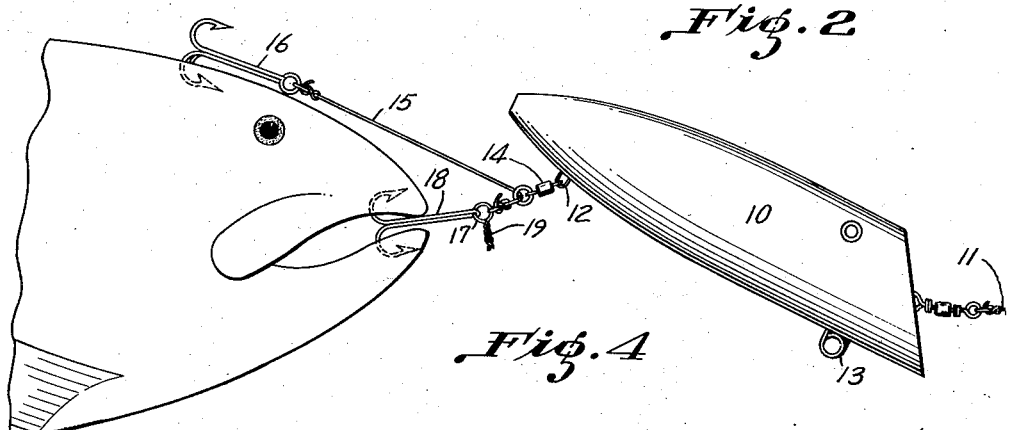
Inventor:
NED P. KRILICH
By Eugene D. Farley
Attorney Patented Aug. 28, 1951

2,565,660

UNITED STATES PATENT OFFICE 2,565,660

FISH LURE

Ned P. Krilich, Tacoma, Wash.

Application December 6, 1947, Serial No. 790,188

2 Claims. (Cl. 43—42.04)

This invention relates to fish lures and has for its objects to provide such a lure which will permit the several hooks to be attached or removed therefrom with great convenience; in which the hooks normally lie in a fixed relation to the lure, though permitted to swing at such positions; in which the two hooks are attached to each other and are removably attached to the lure but, when detached from the lure, are in freely sliding engagement with the lure; in which said removable attachment with the lure is accomplished with metal parts and therefore does not become raveled by wear nor permit the twisting of the front hook; in which the fish, when it first strikes the forward hook, frees the removable attachment from engagement with the lure, then drops to the rear, thus permitting the rear hook to drop back as the lure moves forward and then, when the line tightens, the rear hook is drawn forward and gaffs the head of the fish thus doubly securing it on the line, and dividing the strain of the fish between the two hooks; and which is simple and inexpensive to make, and highly efficient in use.

I attain these and other objects by the devices and arrangements illustrated in the accompanying drawings, in which—

Fig. 1 is a side view of my improved fish lure; Fig. 2 is a cross-section thereof, taken on the line 2—2 in Fig. 1, showing the metal securing loops; Fig. 3 is a view of the metal pin adapted to engage between the loops for removably holding the fish hooks in position on the lure, the front hook being removed therefrom; and Fig. 4 is a side view of the lure after the fish has struck and is secured thereto.

Identical numerals of reference refer to the same parts throughout the several views.

The body 10 of the fish lure is substantially the same as that in common use at the present time, being attached by suitable means to the fish line 11, by means of which it is pulled through the water. The body 10 is provided, on its under side and near its rear end, with a suitable metal eye 12, and near its front end with a spring clip comprising a metal double loop 13. The metal eye 12 may be provided with a swivel link 14, if desired. The hook line 15 passes freely through the ring in the swivel link 14 and has a rear gang hook 16 attached to its rear end. The front end of the hook line 15 is secured to the ring 17 on which the front hook 18 is hung. The ring 17 is formed on the end of the metal pin 19 which is preferably made by twisting a short piece of suitable wire upon itself to form the ring 17, at one end, which passes through the eye of the hook 18 and to which the front end of the hook line 15 is secured.

In practice, when the lure is trailing, the pin 19 has been forced between the two loops 13 and is releasably held thereby until the fish seizes either of the hooks 16 or 18 when the strain, thus occasioned, pulls the pin 19 loose from the double loop 13. The fish immediately pulls backward and draws the rear hook 16 forward, the hook line 15 sliding through the link 14, said hook 16 then engaging the head of the fish, somewhat in the manner illustrated in Fig. 4, thus the strain on the two hooks is divided.

The link 14 is inserted between the line 15 and the eye 12 largely for convenience in stringing the line, but may be omitted if the line 15 is strung through the eye 12.

Since the pin 19 and the clip 13 are of metal it follows that the ring or eye 17 of the pin does not twist while the pin is held by the loops of the clip 13, hence the hook 18 cannot twist thereon though it is free to have a lateral swing.

It is, of course, to be understood that changes may be made in the details of my fish lure as above described without departing from the spirit of my invention, as outlined in the appended claims.

Having, therefore, described my invention, what I claim and desire to secure by Letters Patent, is:

1. A fish lure comprising a solid body adapted to be attached to a fish line; a metal closed loop eye extending from the rear portion of the body; a hook line slidably supported by said eye but otherwise unconnected to the body; a hook connected to one of the ends of said hook line; and releasable securing means for releasably securing the hook line to the forward portion of the lure, the releasable securing means comprising a spring clip secured to said lure, and a metal pin releasably held in the spring clip and having a hook connected thereto attached to the front end of said hook line whereby, when the hook line is strained, the pin is pulled from said clip and the hook line is freed therefrom and is supported from the lure by the said eye alone.

2. The fish lure set forth in claim 1, wherein said metal pin comprises a single length of wire bent at an intermediate point to form an eye or ring and having its ends intertwined to close the eye or ring and to form the pin.

NED P. KRILICH.

REFERENCES CITED

The following references are of record in the file of this patent:

UNITED STATES PATENTS

| Number | Name | Date |
| --- | --- | --- |
| 2,110,382 | Martin | Mar. 8, 1938 |
| 2,189,958 | Middlemiss | Feb. 13, 1940 |
| 2,256,173 | Schechterle | Sept. 16, 1941 |
| 2,459,288 | Robbins et al. | Jan. 18, 1949 |
| 2,461,755 | Miller | Feb. 15, 1949 |